(12) United States Patent
Suzuki

(10) Patent No.: US 11,524,768 B2
(45) Date of Patent: Dec. 13, 2022

(54) ROTARY WING AIRCRAFT

(71) Applicant: AERONEXT INC., Shibuya-ku (JP)

(72) Inventor: Yoichi Suzuki, Tokyo (JP)

(73) Assignee: AERONEXT INC., Shibuya (JP)

( * ) Notice: Subject to any disclaimer, the term of this patent is extended or adjusted under 35 U.S.C. 154(b) by 362 days.

(21) Appl. No.: 16/634,074

(22) PCT Filed: Jul. 27, 2017

(86) PCT No.: PCT/JP2017/027191
§ 371 (c)(1),
(2) Date: Jan. 24, 2020

(87) PCT Pub. No.: WO2019/021414
PCT Pub. Date: Jan. 31, 2019

(65) Prior Publication Data
US 2020/0164966 A1    May 28, 2020

(51) Int. Cl.
*B64C 17/02* (2006.01)
*B64C 39/02* (2006.01)
*B64D 47/08* (2006.01)

(52) U.S. Cl.
CPC .......... *B64C 17/02* (2013.01); *B64C 39/024* (2013.01); *B64D 47/08* (2013.01); *B64C 2201/027* (2013.01); *B64C 2201/108* (2013.01)

(58) Field of Classification Search
CPC . B64C 17/02; B64C 39/024; B64C 2201/027; B64C 2201/108; B64C 2201/127; B64D 47/08
See application file for complete search history.

(56) References Cited

U.S. PATENT DOCUMENTS

| 3,096,044 A * | 7/1963 | Gould ................... B64C 27/52 244/6 |
| 9,630,713 B1 | 4/2017 | Von Novak, III |
| 2012/0037750 A1* | 2/2012 | Dvoeglazov ........... B66F 19/00 244/17.17 |
| 2013/0206915 A1 | 8/2013 | Desaulniers |
| 2017/0085840 A1* | 3/2017 | Mizushina ............ B64D 47/08 |

(Continued)

FOREIGN PATENT DOCUMENTS

CN    105460210 A    4/2016
CN    106005459 A    10/2016
(Continued)

OTHER PUBLICATIONS

Search Report and Written Opinion dated Jul. 10, 2020 for European Patent Application No. 17919293.5.

*Primary Examiner* — Christopher D Hutchens

(57) ABSTRACT

[Object] To provide a rotary wing aircraft capable of self-leveling and ensuring a stable landing state. [Solution] The rotary wing aircraft according to the present disclosure comprises a plurality of rotary blades, an arm part for supporting the plurality of rotary blades, a mounting part for mounting an object, and a connecting part for connecting the mounting part to the arm part in a state where the mounting part is movable within a predetermined range. The position of the connecting part of the rotary wing aircraft of the present disclosure is above the center of gravity of the arm part. Thereby, self-leveling is made possible and a stable landing state can be ensured.

19 Claims, 6 Drawing Sheets

(56) References Cited

U.S. PATENT DOCUMENTS

2020/0164966 A1* 5/2020 Suzuki .................. B64C 39/024
2021/0039775 A1* 2/2021 Suzuki .................. B64D 47/08

FOREIGN PATENT DOCUMENTS

| JP | 2013079034 A | 5/2013 |
| JP | 2014167413 A | 9/2014 |
| JP | 2016507414 A | 3/2016 |
| JP | 6086519 B1 | 3/2017 |
| JP | 2017136914 A | 8/2017 |
| WO | WO2013052178 A2 | 4/2013 |
| WO | WO2016185572 A1 | 11/2016 |

* cited by examiner

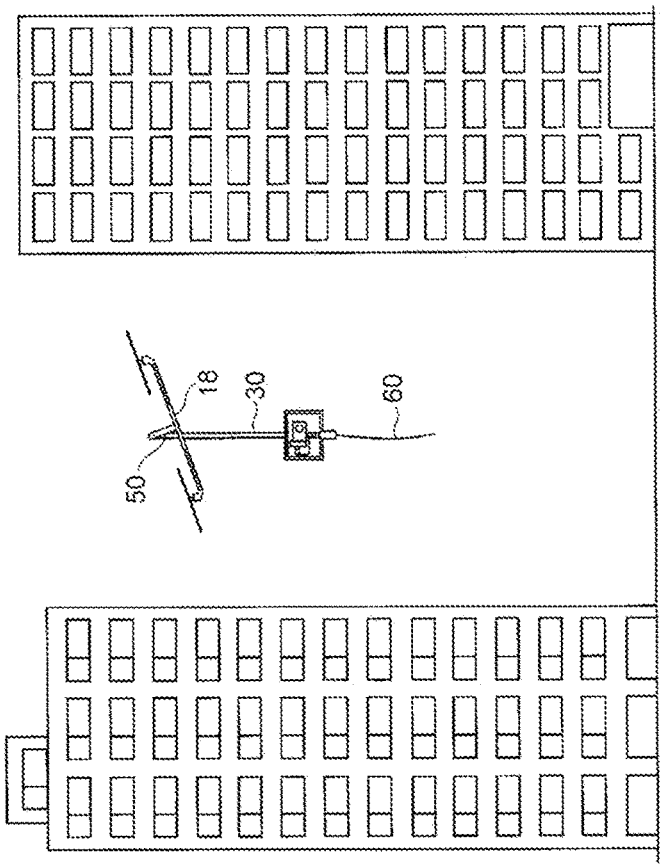
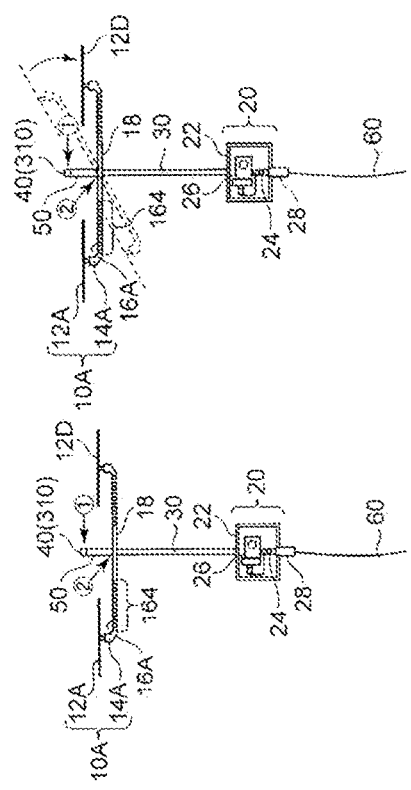
FIG. 4(b)
FIG. 4(a)
FIG. 4(c)

ROTARY WING AIRCRAFT

TECHNICAL FIELD

The present disclosure relates to a rotary wing aircraft. More specifically, the present disclosure relates to a rotary wing aircraft capable of shooting over a long period of time while hovering in a narrow range in the sky in a site such as a tower apartment or a high-rise apartment even when affected by a strong wind during flight. More specifically, the present disclosure relates to a rotary wing aircraft that can maintain the flight unit of the rotary wing aircraft horizontally when the rotary blades of the rotary wing aircraft are stopped during landing or the like.

BACKGROUND ART

Rotary wing aircrafts also called as drones or multicopters are used in various fields such as security, agriculture, and infrastructure monitoring. By using a rotary wing aircraft, it is possible to observe phenomena occurring in places where humans cannot approach, such as disaster sites and undeveloped land, and it is also possible to analyze the observed big data. Among the rotary wing aircrafts, particularly small and lightweight rotary wing aircrafts are being used suitably mainly as rotary wing aircrafts. By using such a rotary wing aircraft, "panoramic aerial photography" is possible in which high-rise building sites such as tower apartments and high-rise apartments can be taken with high resolution.

Recently, rotary wing aircrafts that are small, light and easy to maneuver, less affected by the wind, and capable of maintaining a stable posture are being proposed (for example, Patent Document 1). In this rotary wing aircraft, a first support rod is installed so as to be positioned vertically below the rotary wing aircraft from the central portion of the rotary wing aircraft, and a mounting part is installed at the lower part of the first support rod. Further, this rotary wing aircraft is provided with a second support rod at the lower part of the mounting part, and a mooring rope is connected to the second support rod.

The flight range of the rotary wing aircraft is limited by the length of the mooring rope, so it will not be lost even if the rotary wing aircraft falls out of control. Moreover, since this rotary wing aircraft is provided with the mooring rope and a pilot can hold the rotary wing aircraft by winding up the mooring rope, damage from crashing can be prevented.

Meanwhile, according to the revised Aviation Law that regulates rotary wing aircrafts including unmanned aircrafts and such, it is obliged to attach a mooring rope to the rotary wing aircraft when flying the same.

In addition, when a rotary wing aircraft having a plurality of rotary blades travels in a direction including the horizontal direction, a rotary wing aircraft capable of reducing the difference in the numbers of rotations of the rotary blades forward and backward in the traveling direction has been proposed (for example, Patent Document 2). The rotary wing aircraft includes a plurality of rotary blades, an arm part that supports the plurality of rotary blades, a first mounting part that mounts an object, and the first mounting part that is movable within a predetermined range. A connecting part that connects the first mounting part to the arm part is provided, and the center of lift generated by the rotations of the plurality of rotary blades in the rotary wing aircraft is located at the position of the connecting part. Here, the patent applicant of the present disclosure presents the following patent documents as literature of well-known inventions related to the present disclosure.

PRIOR ART

Patent Literature

Patent Document 1: Japanese Unexamined Patent Publication No. 2013-79034

Patent Document 2: International Patent Publication WO2016/185572 A1

DESCRIPTION OF THE INVENTION

Technical Problem

However, the conventional rotary wing aircraft is rolled from side to side by an airflow such as a crosswind generated between tower apartments and between high-rise buildings. Due to this side-to-side rolling, the rotary wing aircraft tilts while it loses its flight posture. Furthermore, the rotary wing aircraft deviates largely from the site of a tower apartment or a high-rise apartment to fly in the outer region of the site due to the side-to-side rolling.

Generally, when the above-mentioned rotary wing aircraft flies outside the site of a tower apartment or a high-rise apartment, an attempt is made to restore the flight posture by pulling a mooring rope attached to the rotary wing aircraft. However, by pulling the mooring rope provided on the rotary wing aircraft, the flight posture of the rotary wing aircraft is further deteriorated. Eventually, the rotary wing aircraft will lose its flight posture, greatly deviate from the sites of the tower apartment or the high-rise apartment to fly in the outer region of the sites, and then crash in the outer region of the site. In addition, if a GPS device mounted on the rotary wing aircraft is broken during flight, it will become uncontrollable, and the rotary wing aircraft will fly out of the site of the tower apartments and high-rise apartments.

Furthermore, when rotations of motors that drives the rotary blades provided in the rotary wing aircraft is stopped at the time of landing of the conventional rotary wing aircraft, the flight unit including the rotary blades cannot keep it leveled. For this reason, the flight unit of the said rotary wing aircraft tilts. When the flight unit of the rotary wing aircraft is tilted, the rotary wing aircraft cannot maintain the posture of the rotorcraft and ends up falling over.

Further, in a conventional rotary wing aircraft, since the position of a camera necessary to shoot a target object is close to the rotary blades that the rotary wing aircraft is provided with, a situation occurs in which the rotary blades and such are reflected on the screen of the camera during shooting. If the rotary blades of the rotary wing aircraft are reflected on the camera screen, not only is it impossible to take a picture of the object sufficiently, but when taking a video, the value of the images taken up to that moment is also lost.

Also, the conventional rotary wing aircraft rolls side to side in response to airflows such as crosswinds generated between tower apartments or high-rise buildings. In this case, the rotary wing aircraft hovers in a state wherein one side of the rotary blades is tilted. Since the rotary blades are tilted when hovering, the rotary blades are in the way when the rotary wing aircraft is shooting, and there is the problem of the rotary blades of the rotary wing aircraft appearing on the camera screen.

Therefore, the present disclosure is directed to restore the flight posture of the rotary wing aircraft to its original flight state by pulling the mooring rope attached to the rotary wing aircraft even when receiving a strong wind such as a crosswind during the flight. In addition, the present disclosure is directed to provide a rotary wing aircraft that can shoot images over a long period of time while hovering in a narrow range over the site of a tower apartment, a high-rise apartment, or the like even when affected by a strong wind during flight. Furthermore, the present disclosure provides a rotary wing aircraft that can enable self-leveling and ensure a stable landing state when the rotary wing aircraft is in a non-energized state immediately before landing.

Technical Solution

As a result of intensive studies, the inventors of the present disclosure have found that, by providing a connecting part at the upper end portion of a support member on the rotary wing aircraft, and by locating the connecting part above the center point of the lift generated in the rotary wing aircraft, the flight posture of the rotary wing aircraft can be re-established and returned to the original flight state, thereby completing the present disclosure.

Advantageous Effects

According to the present disclosure, it is possible to provide a rotary wing aircraft that can ensure a stable landing state by allowing the flight unit to become horizontal and enable self-leveling when the rotary wing aircraft is in a non-energized state immediately before landing.

BRIEF DESCRIPTION OF THE DRAWINGS

FIGS. 4(*a*) to 4(*c*) are model diagrams illustrating flight postures of the rotary wing aircraft.

DETAILED DESCRIPTION OF THE INVENTION

The contents of embodiments of the present disclosure will be listed and described. A rotary wing aircraft according to an embodiment of the present disclosure has the following configuration.

[Item 1]

A rotary wing aircraft comprising:
a plurality of rotary blades;
an arm part for supporting the plurality of rotary blades;
a mounting part for mounting an object; and
a connecting part for connecting the mounting part to the arm part in a state where the mounting part is movable within a predetermined range,
wherein the position of the connecting part is above the center of gravity of the arm part.

[Item 2]

The rotary wing aircraft as set forth in Item 1,
wherein the connecting part has a biaxial gimbal structure.

[Item 3]

The rotary wing aircraft as set forth in Item 1 or 2,
wherein the mounting part is provided with an adjusting mechanism for extending its length.

[Item 4]

The rotary wing aircraft as set forth in any one of Items 1 to 3,
wherein a rope is attached to the mounting part.

[Item 5]

The rotary wing aircraft as set forth in any one of Items 1 to 4,
wherein the position of the connecting part is above the point of action of the lift generated by the rotations of the plurality of rotary blades on an airframe with respect to the rotary wing aircraft.

[Item 6]

The rotary wing aircraft as set forth in any one of Items 1 to 5,
wherein the position of the connecting part is above the center of gravity of the rotary wing aircraft.

Embodiment 1

Hereinafter, the rotary wing aircraft 1 of the present disclosure will be described with appropriate references to the drawings.

(Basic Structure of Rotary wing aircraft)

Figure 1:
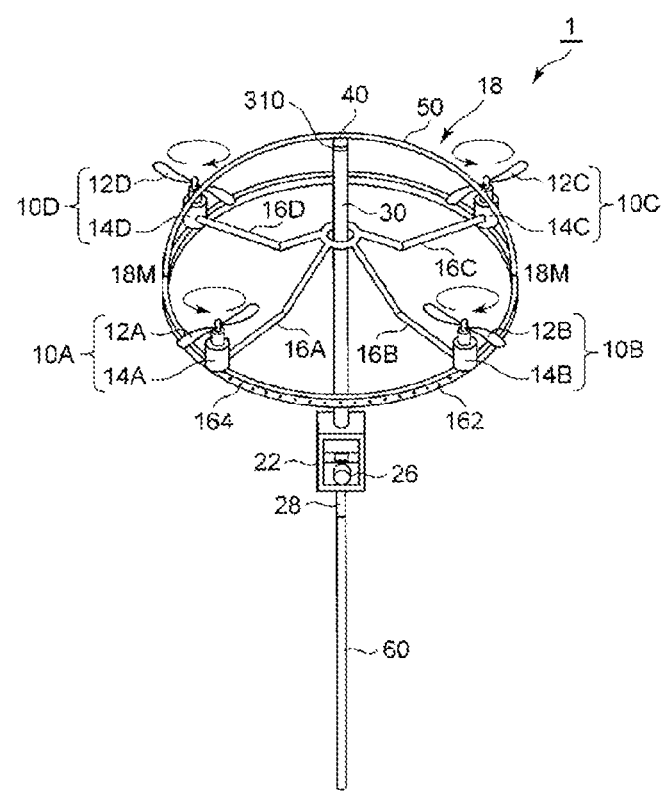
FIG. 1 is a perspective view illustrating a configuration of a rotary wing aircraft.

FIG. 1 is a perspective view illustrating an outline of a rotary wing aircraft 1 of the present disclosure. As shown in FIG. 1, the rotary wing aircraft 1 is provided with a plurality of rotary blade parts 10A to 10D. The rotary blade parts 10A to 10D are configured to have rotary blades 12A to 12D and power units 14A to 14D, respectively. The rotary blades 12A to 12D rotate in a predetermined direction using the power units 14A to 14D as drive sources, respectively. The power units 14A to 14D are not particularly limited as long as they can drive the rotary blades 12A to 12D, respectively, and examples thereof include an electric motor or a small engine. In addition, the number of the rotary blade parts 10 provided in the rotary wing aircraft of the present disclosure is not particularly limited and can be set appropriately. In the first embodiment, a rotary wing aircraft 1 having four rotary blade parts will be described as an example.

The rotary wing aircraft 1 is provided with a plurality of arm parts 16A to 16D for supporting a plurality of rotary blade parts 10A to 10D, respectively, an annular flight member 162 that is a base of a flight unit 18, an imaging unit 20 provided below the flight unit 18, and a support member 30 for connecting the flight unit 18 and the imaging unit 20. The flight unit 18 and the imaging unit 20 are connected via a lower end portion of the support member 30. The imaging unit 20 includes a storage box 22 and a camera body for shooting 26, and the storage box 22 has a box shape for storing the camera body for shooting 26.

In the rotary wing aircraft 1 shown in FIG. 1, the lower end portion of the support member 30 is connected to a storage box attachment part 24 provided on the upper surface of the imaging unit 20 having a box shape. The rotary wing aircraft 1 is configured to have a fixing support member 28, which communicates with the lower surface of the imaging unit 20, for fixing the camera body for shooting 22 in the imaging unit 20 having a box shape. The support member 30 and the fixing support member 28 are located on the same straight line.

A mooring rope 60 for controlling the flight position and flight form of the rotary wing aircraft 1 is attached to the end portion of the fixing support member 28. The mooring rope 60 stabilizes the flight state of the rotary wing aircraft 1 in the same manner as the so-called "kite leg". When the rotary wing aircraft 1 flies stably, the imaging unit 20 can be kept leveled horizontally.

The rotary wing aircraft 1 is most suitable for shooting the view of tower apartments, high-rise apartments and such, and is premised on flying in the sky within the site of the tower apartments, high-rise apartments, and such. For this reason, the mooring rope 60 is provided in view of preventing the rotary wing aircraft 1 from flying in the sky outside the site of the tower apartment or the high-rise apartment. In addition, if the mooring rope 60 is attached below the imaging unit 20, how the mooring rope 60 is attached is not particularly limited. For example, it may be attached directly to the bottom surface of the imaging unit 20, without going through the end portion of the fixing support member 28.

The rotary wing aircraft 1 is provided with arm parts 16A to 16D that support the rotary blade parts 10A to 10D, respectively. In the first embodiment, the arm part 16, which is included in the flight unit 13, is provided with four arms 16A to 16D, but the number of arm parts 16 is not limited thereto. For example, as the arm part 16 of the rotary wing aircraft 1, six, eight, ten, twelve arm parts may be provided as appropriate. When the rotary wing aircraft 1 flies stably, and is equipped with a heavy and highly accurate camera, the number of the arm parts 16 may be set to six or more according to the number of the rotary blade parts 10, for example the number of arm parts 16 can be six or more.

In FIG. 1, four arm parts 16A to 16D are provided in four directions so as to be equally spaced in an annular shape. That is, the four arm parts 16A to 16D are provided such that the interval between adjacent arm parts is 90°. Further, the arm parts 16A to 16D may have a linear shape or may have a bent shape based on the linear shape in design aspects.

The arm parts 16A to 16D extend outward at equal intervals around the ring provided on the outer periphery of the support member 30 as a center. The support member 30 communicates with the ring and extends upward. The upper end portion 310 of the support member 30 has a connecting part 40 for connecting the flight unit 18 and the support member 30.

Figure 2:
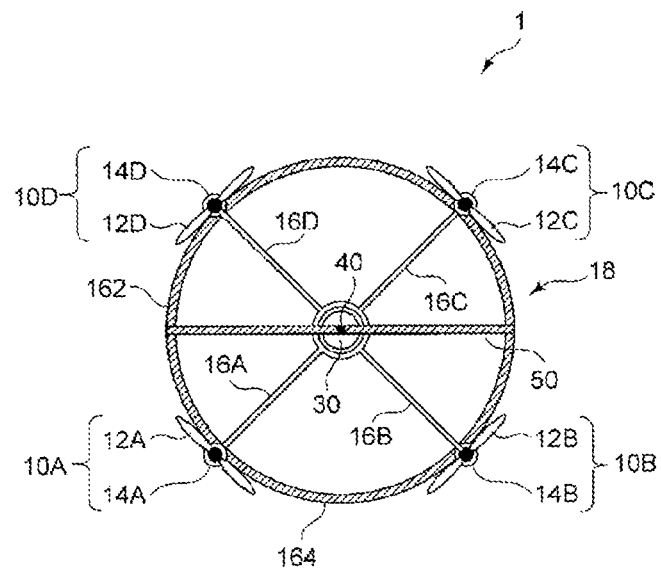
FIG. 2 is a schematic view seen from directly above the rotary wing aircraft.

FIG. 2 is a schematic view of the rotary wing aircraft 1 of the first embodiment as viewed from directly above. As shown in FIG. 2, the rotary wing aircraft 1 may have a structure in which bottom end portions of the rotary blade parts 10A to 10D of the plurality of arm parts 16A to 16D are connected, respectively, by a flight member 162. When the rotary blade parts 10A to 10D located at the ends of the plurality of arm parts 16A to 16D are connected, respectively, by the flight member 162, the adjacent rotary blade parts 10A to 10D are connected, and the external shape of the flight member 162 viewed from directly above the rotary wing aircraft 1 is an annular shape.

The shape of the flight member 162 is not particularly limited as long as it can connect the adjacent rotary blade parts 10, and may be an annular, elliptical, or rectangular frame body. By connecting the rotary blade part 10 located at the end of the arm part 16 via the flight member 162, the flight unit 18 is more stable structurally. A light emitting body 164 such as a light emitting diode may be provided on the outer side surface of the flight member 162 as a mark when the rotary wing aircraft 1 is flying at night.

In the rotary wing aircraft 1 shown in FIG. 2, through the connecting part 40 installed at the upper end portion 310 of the support member 30, a connecting member 50 for bridging the portion on the opposing flight member 162 with the connecting part 40 is provided. The connecting member 50 is driven in synchronization with the connecting part 40 provided on the support member upper end portion 310 of the support member 30. When the connecting part 40 is driven, the connecting member 50 is inclined or rotated. Since the connecting member 50 is connected to the flight unit 18, the flight unit 18 is inclined or rotated when the connecting part 40 is driven. The flight unit 18 inclines or rotates depending on the direction and size in which the connecting part 40 is driven. The rotary wing aircraft 1 can incline or rotate the flight unit 18 around the support member 30 as the center.

Specifically, the rotary wing aircraft 1 is provided with a connecting member 50 that bridges the intermediate point of the flight unit 18 set between the rotary blade part 10A and the rotary blade part 10D, with the intermediate point of the flight unit 18 set between the rotary blade part B and the rotary blade part C. Since the connecting member 50 passes through the connecting part 40 provided at the upper end portion 310 of the support member 30, the flight unit 18 can be inclined with the connecting part 40 as a vertex when the connecting part 40 is driven. Similarly, the flight unit 18 can also rotate with the connecting part 40 as a vertex, when the connecting part 40 is driven.

The connecting part 40 is not particularly limited as long as it is a mechanism that can incline or rotate the flight unit 18. It can be set as appropriate according to the function of the rotary wing aircraft. For example, a uniaxial gimbal structure, a biaxial gimbal structure, or a triaxial gimbal structure may be adopted as the connecting part 40. Further, the gimbal structure may or may not be provided with a driving device such as a motor.

When the rotary wing aircraft of the present disclosure is used as a rotary wing aircraft for the purpose of shooting a view of a tower apartment, a high-rise apartment, etc., the flight mode is mainly for vertical ascending, so a biaxial gimbal structure may be used as the connecting part 40. When the connecting part 40 is driven, the connecting member 50 can be inclined and can also be rotated. When the connecting member 50 is inclined or rotated, the flight unit 18 connected to the connecting member 50 is inclined or rotated. When the frame 18 is inclined or rotated, the rotary blades 12A to 12D mounted on the flight unit 18 can be inclined or rotated.

Figure 3:
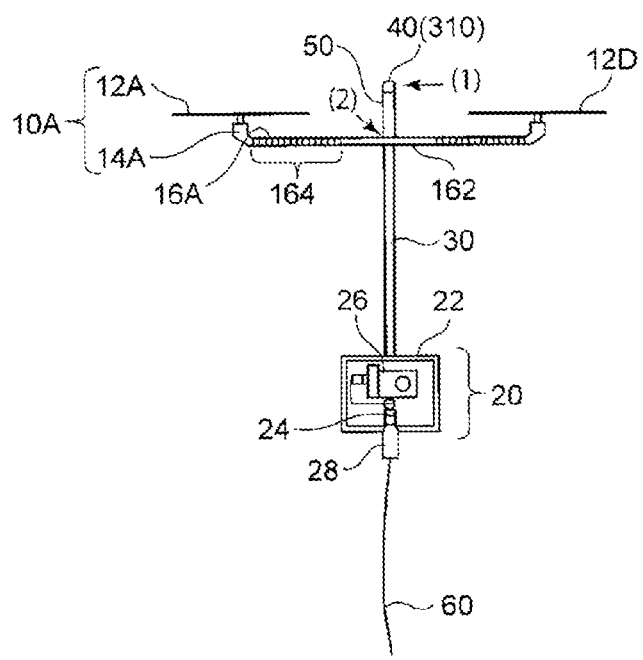
FIG. 3 is a side view of the rotary wing aircraft.

FIG. 3 is a side view of the rotary wing aircraft 1. In the technical features of the rotary wing aircraft 1, it is provided with a connecting part 40 at the upper end portion 310 of the support member 30, the flight unit 18 can be inclined or rotated with the connecting part 40 as a vertex, and the connecting part 40 may be located above the center point of the lift generated in the rotary wing aircraft by rotating a plurality of rotary blades 12A to 12D. In the rotary wing aircraft 1 shown in FIG. 3, the support member 30 overlaps the connecting member 50. For this reason, in the rotary wing aircraft 1 shown in FIG. 3, the connecting member 50 and the support member 30 exist on the same straight line.

As shown in FIG. 3, the connecting part 40(1) is located above the center point (2) of the lift generated in the rotary wing aircraft due to the rotations of the plurality of rotary blades 12A to 12D. In the conventional rotary wing aircraft, the connecting part between the flight unit and the support member coincides with the center point (2) of the lift generated in the rotary wing aircraft as a plurality of rotary blades rotate, or is set at a location lower than the center point (2) of the lift generated in the rotary wing aircraft.

In the rotary wing aircraft of the present disclosure, the center point of the connecting part 40 and the center point of the lift generated in the rotary wing aircraft adopt the above positional relationship, so that the rotary wing aircraft 1 can reestablish its flight posture and can return to its original flight state even if it is affected by strong winds such as crosswinds during flight, by pulling the mooring rope 60 attached to the rotary wing aircraft 1.

On the other hand, in the conventional rotary wing aircrafts, the center of gravity G of the connecting part 40 of the flight unit 18 and the support member 30 is located below the center point of lift generated in the rotary wing aircraft 1. For this reason, conventional rotary wing aircrafts are subject to an additional downward force even when the mooring rope of the rotorcraft is pulled to restore the original posture from the posture in which the flight posture is lost due to strong winds such as crosswinds. As a result, the conventional rotary wing aircraft further deteriorates the flight posture of the rotary wing aircraft from the posture in which the flight posture is lost due to strong winds such as crosswinds. Consequently, there are cases where the conventional rotary wing aircraft leaves the sky range in a site such as a high-rise apartment, flies in the sky outside the site, and falls from a high-rise floor.

(Flight Mode of Rotary Wing Aircraft)

FIG. 4 is a model diagram showing the flight mode of the rotary wing aircraft 1. Based on FIG. 4, the flight mode of the rotary wing aircraft 1 of the first embodiment is described. The flight mode of the rotary wing aircraft 1 will be described separately as (a) a process of taking off from the ground on the site of a tower apartment, a high-rise apartment, etc. as the starting point; (b) a process of starting flight by ascending vertically and shooting the high-rise floors of tower apartments, high-rise apartments and such; and (c) a process of landing after shooting the high-rise floors.

(a) The Process of Taking Off from the Ground in a Site Such as a Tower Apartment As shown in FIG. 4(*a*), a camera body for shooting 26 is mounted in the storage box 22 configuring the imaging unit 20 of the rotary wing aircraft 1 at a departure place in a site such as a tower apartment or a high-rise apartment. An operator of the rotary wing aircraft 1 operates a radio control transmitter having an operation unit to increase the outputs of the power units 14A to 14D of the rotary blade parts 10A to 10D, and increases the numbers of rotations of the rotary blades 12A to 12D, respectively. As the rotary blades 12A to 12D rotate, the lift necessary to lift the rotary wing aircraft 1 is generated vertically upward. When the lift exceeds the gravity acting on the rotary wing aircraft 1, the rotary wing aircraft 1 leaves the ground and takes off from the starting point. In addition, the rotary blades facing each other in the flight unit 18 rotate in the same direction. Specifically, in the rotary wing aircraft 1, the rotary blade 12A and the rotary blade 12C rotate leftward, and the rotary blade 12B and the rotary blade 12D rotate rightward.

(b) The Process of Ascending Vertically and Starting to Fly and Shooting High-Rise Floors Such as Tower Apartments and High-Rise Apartments As shown in FIG. 4 (*b*), the rotary wing aircraft 1 ascends vertically toward the sky in the site of a tower apartment, a high-rise apartment, etc. by increasing the numbers of rotations of the rotary blades 12A to 12D. Thereafter, the rotary wing aircraft 1 continues to ascend and reaches a certain altitude. The rotary wing aircraft 1 that has reached a certain altitude stays still in the air (hovering) at the altitude. The altitude is appropriately determined according to the flight route of the rotary wing aircraft 1, the height of a building such as a tower apartment or a high-rise apartment, the aviation laws applied to the rotary wing aircraft 1, or the like. The operator may set the altitude in advance at which the rotary wing aircraft 1 performs staying still in the air (hovering) in consideration of various conditions.

Since the weight of the rotary wing aircraft 1 and the lift generated in the rotary wing aircraft 1 by the rotations of the rotary blades 12A to 12D are mechanically balanced, the rotary wing aircraft is able to stay still in the air (hovering). The rotational speeds of the rotary blades 12A to 12D are maintained at constant levels. The staying still in the air (hovering) is performed in order for the rotary wing aircraft 1 to start shooting a tower apartment, a high-rise apartment, etc. using the camera body 26 for shooting.

As shown in FIG. 4(*b*), when the rotary wing aircraft 1 moves horizontally at the altitude from a state where it is staying still in the air (hovering), the flight unit 18 is inclined. When the rotary wing aircraft 1 moves horizontally, the rotational speeds of the rotary blades 12A to 12D included in the flight unit 18 are adjusted to be substantially the same. The rotary wing aircraft 1 can start shooting at a position moved horizontally while maintaining the altitude. The rotary wing aircraft 1 shoots high-rise floors such as a tower apartment and a high-rise apartment at a predetermined position while staying still in the air (hovering) at a predetermined altitude. In addition, the rotary wing aircraft 1 can fly in the horizontal direction and change the shooting position as necessary. Further, the rotary wing aircraft 1 can fly in the vertical direction and change the shooting position.

(c) The Process of Landing after Shooting the High-Rise Floor

As shown in FIG. 4(*c*), the rotary wing aircraft 1 lands at a destination in a site such as a tower apartment or a high-rise apartment. In FIG. 4(*c*), the destination may be the ground surface, or may be a heliport dedicated to the rotary wing aircraft 1 provided in a tower apartment, a high-rise apartment, or the like. The rotary wing aircraft 1 reduces the rotational speeds of the rotary blades 12A to 12D above the destination site. The rotary wing aircraft 1 is lowered in altitude and enters a landing posture. When the rotary wing aircraft 1 enters the landing posture, the flight unit 18 is kept leveled horizontally with respect to the ground surface. When the flight unit 18 is inclined, the rotational speeds of the rotary blades 12A to 12D are adjusted so that the flight unit 18 is horizontal with respect to the ground surface.

The rotary wing aircraft 1 stops the rotations of the rotary blades 12A to 12D of the flight unit 18 immediately before landing. By stopping the rotations of the rotary blades 12A to 12D, the flight unit 18 becomes horizontal with respect to the ground surface by its own weight. Specifically, in the rotary wing aircraft 1 shown in FIG. 4(*c*), the rotary blades 12A to 12D are brought into a non-energized state from the state in which the flight unit 18 is inclined as shown by the dotted line. As shown by the solid line, the flight unit 18 becomes horizontal. The rotary blades 12A to 12D are naturally made horizontal due to the influence of gravity. Thus, since the rotary wing aircraft 1 of the present disclosure is provided with the connecting part 40 with the flight unit 18 at the upper end portion 310 of the support member 30, a stable landing state can be ensured when the rotary wing aircraft 1 is in a non-energized state immediately before landing by having the flight unit 18 to be horizontal.

As described above, the rotary wing aircraft 1 according to the first embodiment can secure a stable flight in the premises of a tower apartment, a high-rise apartment, and the like. Also, it can be suitably used since it is not shaken much during shooting with the camera body for shooting 26. As long as the rotary wing aircraft 1 is staying still in the air (hovering), the rotary wing aircraft 1 of the first embodiment can keep the imaging unit 20 horizontally, and the imaging unit 20 does not shake greatly. For this reason, the rotary wing aircraft 1 can sufficiently cope with the shutter speeds necessary for night scene photography.

Embodiment 2

The rotary wing aircraft according to the second embodiment is characterized in that the center point of the lift generated in the rotary wing aircraft and the action point of gravity G of the support member 30 and the imaging unit 20 coincide. Since the rotary wing aircraft is designed so that the center point of the above-mentioned lift and the action point of gravity G coincide, no rotation moment due to gravity by the support member 30 and the imaging unit 20 is generated. For this reason, in the rotary wing aircraft of the second embodiment, when traveling in the horizontal direction, the rotational speeds of the front rotary blades and the rotational speeds of the rear rotary blades can be made substantially equal in the traveling direction.

The rotary wing aircraft ascends almost vertically from the mooring point of the mooring rope, and is suitable for shooting for a long period of time while hovering in a narrow range. Furthermore, the rotary wing aircraft is further improved in convenience when moving horizontally in a site such as a tower apartment or a high-rise apartment. That is, the rotary wing aircraft is suitable for panoramic photography of a tower apartment, a high-rise apartment, or the like, and has a basic operation of flying vertically (directly above) from the mooring point of a mooring rope. However, when the rotary wing aircraft shoots the surroundings of tower apartments, high-rise apartments, etc., when performing outer wall inspections for example, it is necessary not only to fly vertically (directly above) but also to fly horizontally. When the rotary wing aircraft flies in the horizontal direction, the flight unit 18 must be inclined.

In the rotary wing aircraft according to the second embodiment, even when the flight unit 18 has to be inclined in order to travel in the horizontal direction, by having the rotational speeds of the front rotors and the rear rotors to be substantially equal, the outputs of the power units 14A to 14D for driving the rotary blades 12A to 12D, respectively, can be suppressed.

Embodiment 3

The rotary wing aircraft of the third embodiment includes an adjustment mechanism for the support member 30 to extend the length of the support member 30. The adjustment mechanism may be provided at the upper part or the lower part with respect to the ring that engages with the arm parts 16A to 16D provided on the outer periphery of the support member 30. The adjustment mechanism extends the length of the support member 30.

When the rotary wing aircraft lands on a site such as a tower apartment or a high-rise building, the support member 30 is extended vertically downward by the adjusting mechanism. By extending the support member 30 vertically downward, the center of gravity of the rotorcraft 3 moves downward, and a stable landing state can be ensured.

The rotary wing aircraft of the present disclosure is assumed to be used in a site such as a tower apartment or a high-rise apartment. For this reason, even if the rotary wing aircraft is affected by the rising airflow generated in the vicinity of a tower apartment, a high-rise building, etc., by moving the center of gravity of the rotary wing aircraft downward by the adjustment mechanism at the same time as entering the landing posture, it is possible to maintain a stable flight state against the rising airflow as appropriate.

The adjustment mechanism is not particularly limited as long as it can extend the length of the support member 30. As the adjustment mechanism, for example, a rack and pinion mechanism or a steering gear mechanism used for focusing in an optical device or the like may be adopted. Further, the adjustment mechanism may include a tube structure having elasticity. In the adjusting mechanism, the support member 30 may be configured to have a support member serving as an outer tube and a support member serving as an inner tube.

Since the rotary wing aircraft of the third embodiment includes the adjustment mechanism, the distance between the flight unit 18 and the imaging unit 20 can be made as large as possible. For this reason, the rotary wing aircraft according to the third embodiment can secure a deep vertical viewing angle without the flight unit 18 being reflected in the imaging field of view by the camera body for shooting 26 mounted on the imaging unit 20.

Furthermore, in the rotary wing aircraft according to the third embodiment, the flight unit 18 and the imaging unit 20 may be farther away from each other compared to conventional rotary wing aircrafts, and so it is possible to shoot the lower floors of tower apartments, high-rise apartments or the like with the imaging unit 20 located at the lower part while at the same time it is possible to shoot a view of the tower apartments and high-rise apartments from the lower floors towards the higher floors.

Embodiment 4

Figure 5:
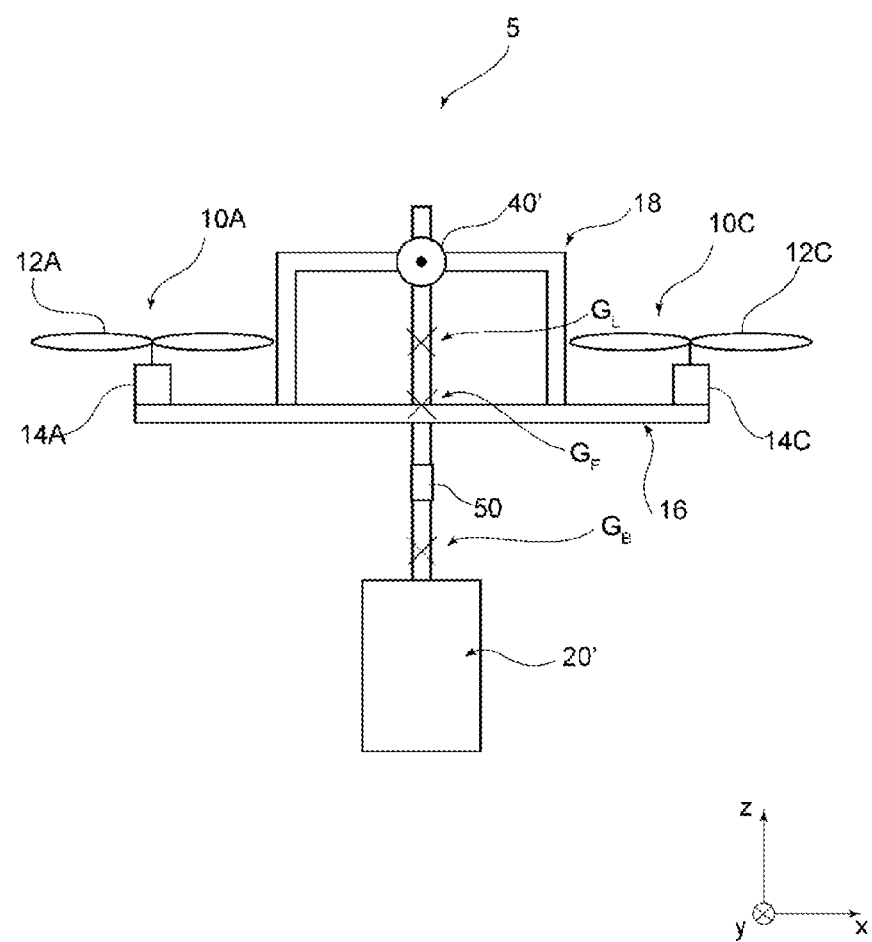
FIG. 5 is a side view of another rotary wing aircraft.
Figure 6:
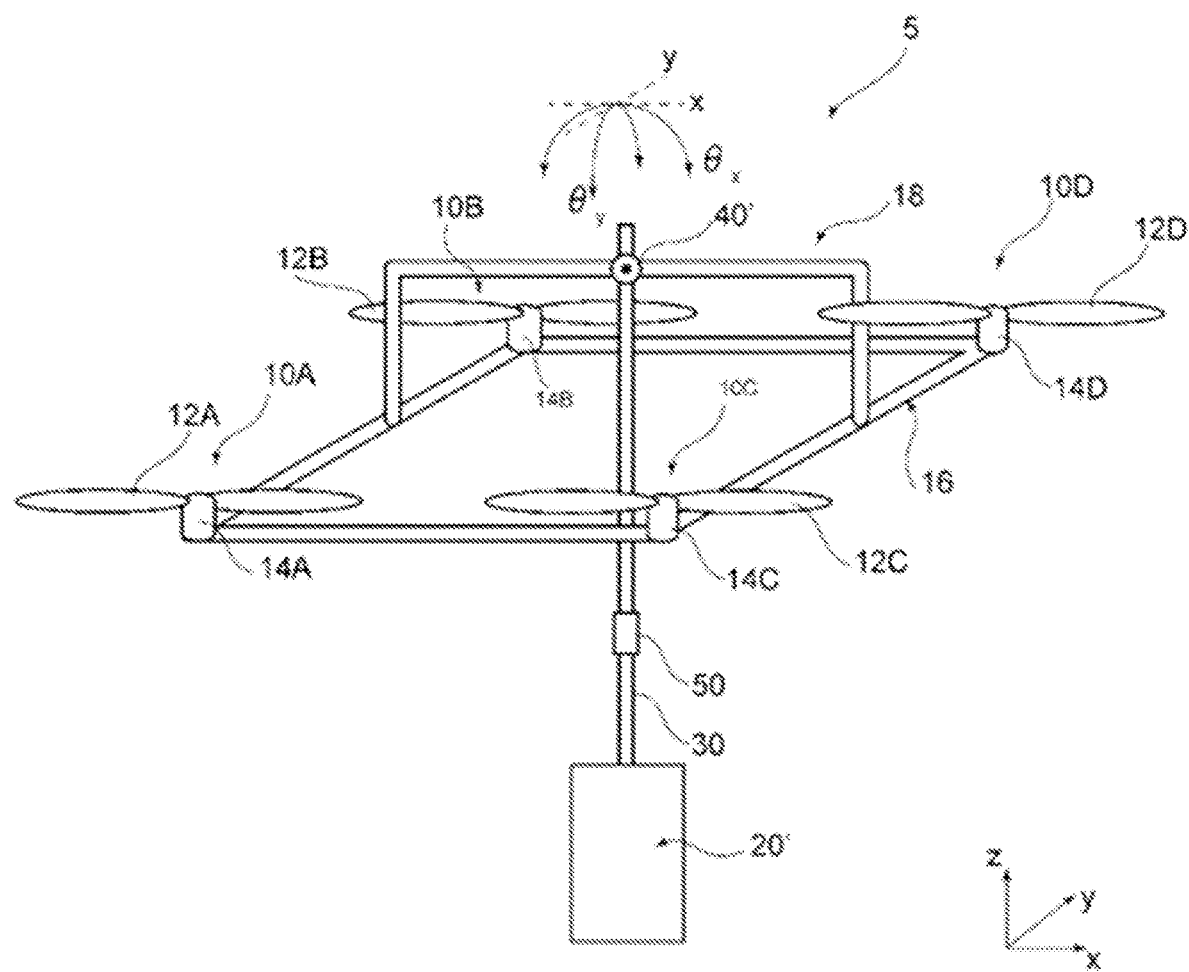
FIG. 6 is a perspective view of another rotary wing aircraft.
Figure 7:
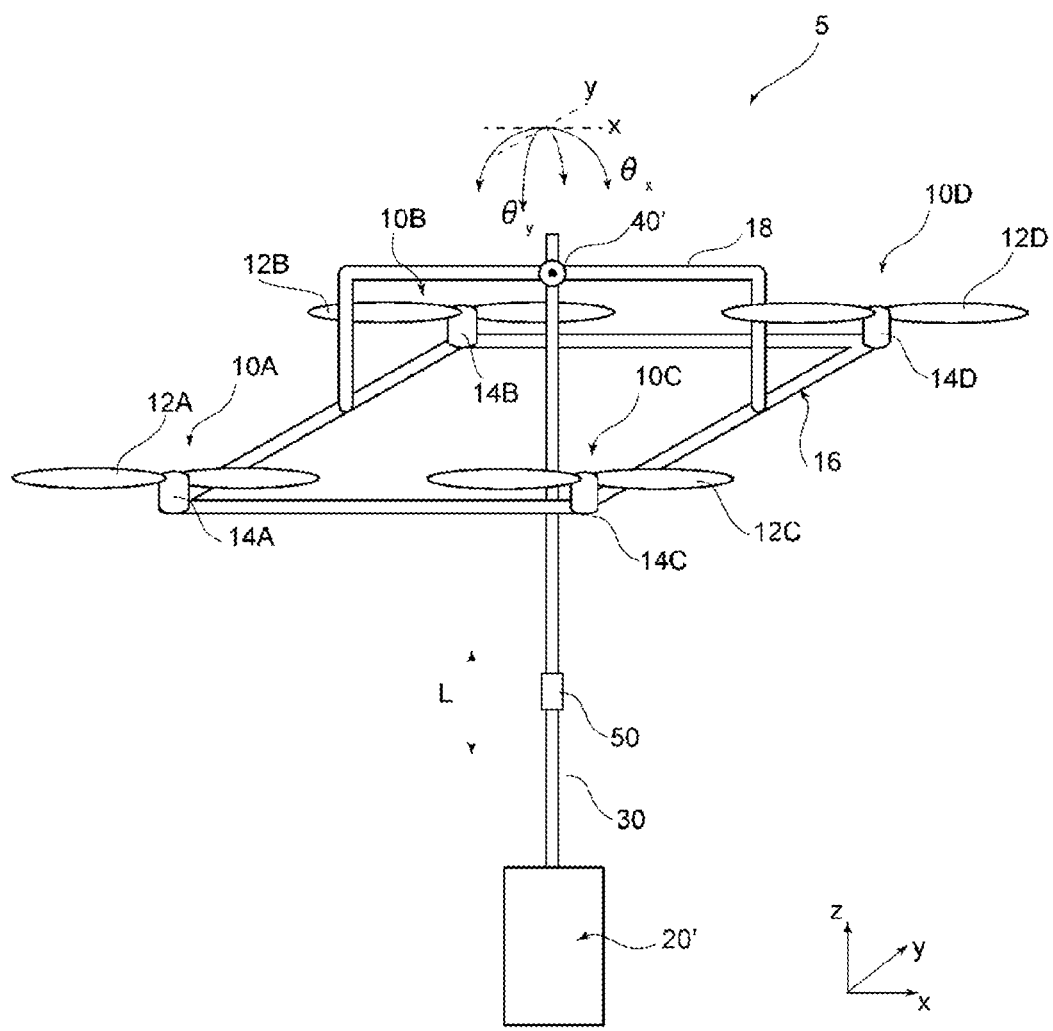
FIG. 7 is another perspective view of another rotary wing aircraft.

As shown in FIGS. 5 to 7, the rotary wing aircraft 5 of the fifth embodiment is provided with a plurality of rotary blades 12A to 12D, power units (motors) 14A to 14D for rotating the rotary blades 12A to 12D, respectively, an arm part 16 that supports the power units (motors) 14A to 14, a mounting part 20' that mounts an object such as a camera, and a connecting part 40' that connects the mounting part 20' to the arm part 16 in a movable (displaceable) state wherein the mounting part 20' is within a predetermined range (for example, two axes in the X direction and the Y direction). The rotary blades 12A to 12D, the power units (motors) 14A to 14D, and the arm part 16 are included in a flight unit 18. The mounting part 20' of the present embodiment includes a frame that extends downward from the connecting part 40' and a mounting part that is attached to the front end of the frame.

As shown in FIG. 5, the rotary wing aircraft 5 of the present embodiment includes, lined up in a following order from bottom to top, a center of gravity for the entire rotary wing aircraft 5 when stopped $G_B$ (airframe center of gravity), a center of gravity of the flight unit 18 $G_F$ (flight center of gravity), an action point $G_L$ (buoyancy center of gravity) of the lift generated on the airframe due to the rotations of the rotary blades 12A to 12D with respect to the rotary wing aircraft 5, a connecting part 40'. That is, the connecting part 40' of the present embodiment is located above (in the Z direction) the airframe center of gravity $G_B$, the flight center of gravity $G_F$, and the buoyancy center of gravity $G_L$.

As shown in FIG. 6, the connecting part 40' is configured such that the flight unit 18 can be displaced along the θx and θy directions within the two axes of the x direction and the y direction around the connecting part 40'.

As described above, the rotary wing aircraft 5 of the fourth embodiment can ensure stable flight at the site of a tower apartment, a high-rise apartment, etc., similarly to the rotary wing aircrafts of the first to third embodiments. Since there is little shaking of the mounting part 20', it can be suitably used for night scene photography with a camera, for example. In addition, as long as the rotary wing aircraft 5 is staying still in the air (hovering), the rotary wing aircraft 5 of the fourth embodiment can keep the mounting part 20' leveled horizontally, and the mounting part 40' is not greatly shaken. For this reason, it is possible to sufficiently cope with the shutter speeds required for night scene photography.

In addition, when the rotary wing aircraft 5 lands on a site such as a tower apartment or a high-rise building, the support member 30 of the mounting part 20' is extended vertically downward by the adjustment mechanism 50. By extending the support member 30 vertically downward, the center of gravity of the rotary wing aircraft moves downward, and a more stable landing state can be ensured.

The rotary wing aircraft of the present disclosure is assumed to be used in a site such as a tower apartment or a high-rise apartment or the like. For this reason, even if the rotary wing aircraft is affected by the rising airflow generated in the vicinity of a tower apartment, a high-rise building, etc., the center of gravity of the rotary wing aircraft is lowered downward by the adjustment mechanism at the same time as entering the landing posture. By moving, it is possible to maintain a stable flight state against the rising airflow as appropriate.

As shown in FIGS. 6 and 7, the adjustment mechanism 50 is not particularly limited as long as the length of the support member 30 can be extended. As the adjustment mechanism, for example, a rack and pinion mechanism or a steering gear mechanism used for focusing in an optical device or the like may be adopted. Further, the adjustment mechanism may include a tube structure having elasticity. In the adjusting mechanism, the support member 30 may be configured to have a support member serving as an outer tube and a support member serving as an inner tube.

Since the rotary wing aircraft of the third embodiment includes the adjustment mechanism, the distance between the flight unit 18 and the mounting part 20' can be made as large as possible. For this reason, the rotary wing aircraft according to the third embodiment can secure a deep vertical viewing angle without the flight unit 18 being reflected in the imaging field of view by the imaging camera body mounted on the mounting part 20'.

As described above, according to the embodiment of the present disclosure, the flight unit can perform self-leveling at the time of non-energized state (when stopped).

As mentioned above, although the embodiment of the present disclosure was described, the present disclosure is not limited to the above-described embodiment, and conditional changes and etc. that do not deviate from the gist of the present disclosure are all within the scope of application of the present disclosure.

Industrial Applicability

The rotary wing aircraft of the present disclosure can be suitably used for shooting over a long period of time while hovering in a narrow range above a site such as a tower apartment or a high-rise apartment or the like. In addition, the rotary wing aircraft of the present disclosure can be expected to be used in surveying sites in low-rise apartment sites and high-rise building construction sites for shooting the view of tower apartments, high-rise buildings, and so on. Thus, it can be used in various industries such as an industry related to airplanes such as multicopters•drones and the like, a field related to housing•construction•architecture, security field, agriculture, and infrastructure monitoring.

Description Of Reference Numerals

1~5 rotary wing aircraft
10A-10D rotary blade part
12A-12D rotary blade
14A-14D power unit
16A-16D arm part
18 directing arm
162 flight member
164 light emitting body (light emitting diode)
18 flight unit
20 imaging unit
20' mounting part
22 storage box
24 storage box attachment part
26 camera body for shooting
28 fixing support member
30 support member
310 upper end portion of support member
40, 40' connecting part
50 adjusting part
U lift center point
G gravity center point
70A~D landing legs (supporting member)
72 orthogonal member (between leg support members AD)
74 orthogonal member (between leg support members BC)

The invention claimed is:

1. A rotary wing aircraft comprising:
    a flight unit including a plurality of rotary blades, a plurality of power units as drive sources of the plurality of rotary blades, and an arm part for supporting the plurality of rotary blades;
    a mounting part for mounting an object,
    wherein the mounting part includes an adjusting mechanism for extending a length of the mounting part; and
    a connecting part for connecting the mounting part to the flight unit in a state where the mounting part is movable within a predetermined range,
    wherein the position of the connecting part is above a center of gravity of the flight unit, and
    wherein the flight unit includes a first frame having a periphery on which the plurality of power units are disposed, and the plurality of power units are arranged around the center of gravity of the flight unit.

2. The rotary wing aircraft of claim 1,
    wherein the connecting part has a biaxial gimbal structure.

3. The rotary wing aircraft of claim 2,
    wherein a rope is attached to the mounting part.

4. The rotary wing aircraft of claim 3,
    wherein the position of the connecting part is above a point of action of a lift generated by the rotations of the plurality of rotary blades on an airframe with respect to the rotary wing aircraft.

5. The rotary wing aircraft of claim 4,
    wherein the position of the connecting part is above a center of gravity of the rotary wing aircraft.

6. The rotary wing aircraft of claim 3,
    wherein the position of the connecting part is above a center of gravity of the rotary wing aircraft.

7. The rotary wing aircraft of claim 2,
wherein the position of the connecting part is above a point of action of a lift generated by the rotations of the plurality of rotary blades on an airframe with respect to the rotary wing aircraft.

8. The rotary wing aircraft of claim 7,
wherein the position of the connecting part is above a center of gravity of the rotary wing aircraft.

9. The rotary wing aircraft of claim 2,
wherein the position of the connecting part is above a center of gravity of the rotary wing aircraft.

10. The rotary wing aircraft of claim 1,
wherein a rope is attached to the mounting part.

11. The rotary wing aircraft of claim 10,
wherein the position of the connecting part is above a point of action of a lift generated by the rotations of the plurality of rotary blades on an airframe with respect to the rotary wing aircraft.

12. The rotary wing aircraft of claim 11,
wherein the position of the connecting part is above a center of gravity of the rotary wing aircraft.

13. The rotary wing aircraft of claim 10,
wherein the position of the connecting part is above a center of gravity of the rotary wing aircraft.

14. The rotary wing aircraft of claim 1,
wherein the position of the connecting part is above a point of action of a lift generated by the rotations of the plurality of rotary blades on an airframe with respect to the rotary wing aircraft.

15. The rotary wing aircraft of claim 14,
wherein the position of the connecting part is above a center of gravity of the rotary wing aircraft.

16. The rotary wing aircraft of claim 1,
wherein the position of the connecting part is above a center of gravity of the rotary wing aircraft.

17. The rotary wing aircraft of claim 1, wherein the flight unit further includes a second frame connected to the connecting part and having ends connected to the first frame.

18. The rotary wing aircraft of claim 17, wherein the plurality of power units are disposed at a plurality of vertices of the first frame, respectively.

19. The rotary wing aircraft of claim 17, further comprising a support member for connecting the flight unit and the mounting part, the support member passing through a plane defined by the first frame of the flight unit.

* * * * *